United States Patent Office 2,863,298
Patented Dec. 9, 1958

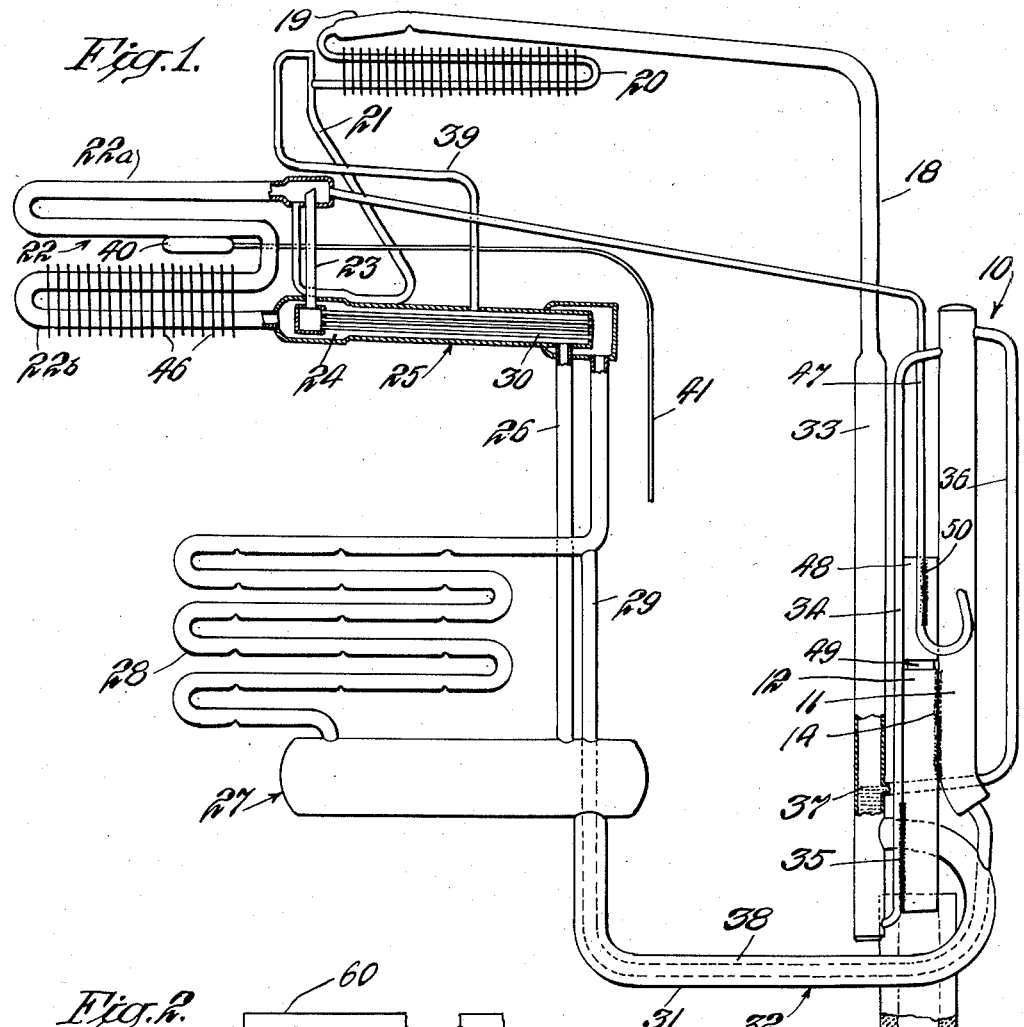

2,863,298

ABSORPTION REFRIGERATION

Axel Gosta Hellstrom, Johanneshov, Sweden, assignor to Aktiebolaget Elektrolux, Stockholm, Sweden, a corporation of Sweden Application November 1, 1955, Serial No. 544,307

Claims priority, application Sweden November 8, 1954

12 Claims. (Cl. 62—148)

My invention relates to absorption refrigeration apparatus, and more particularly to apparatus of this type in which, for the purpose of modifying its normal operation, liquid absorbent is transferred to a part thereof which is normally free of absorbent.

It has already been proposed to effect defrosting of an evaporator or cooling element of absorption refrigeration apparatus by providing a heat operated vapor-liquid lift pump to raise warm absorption liquid from the level of the absorption liquid circuit to a place at a higher level, such as the evaporator or cooling element. In absorption refrigeration apparatus where absorption liquid is normally circulated in its circuit by a vapor-liquid lift pump which is heated by a source of heat automatically controlled responsive to an operating condition of the apparatus, operation of a heat operated lift pump to transfer warm absorption liquid to the place at the higher level may be instigated at a time when the automatic control functions to stop normal circulation of absorption liquid in its circuit.

It is especially advantageous under certain conditions for the normal circulation of absorption liquid to be taking place at the same time absorption liquid is being transferred to the place at the higher level. This is particularly true when the height of the reaction head, under which liquid is being raised by vapor-liquid lift action to the place at the higher level, is favorably influenced by the normal circulation of absorption liquid in its circuit.

It is an object of my invention, therefore, to provide an improvement in apparatus of this type in which a first source of heat for the vapor-liquid pump to effect normal circulation of absorption liquid in its circuit and a second source of heat for the vapor-liquid pump to raise absorption liquid to a place at a higher level are controlled in such manner that the first heat source is controlled independently of the second heat source, and that whenever the second heat source is rendered operable, the first heat source is also rendered operable.

The above and other objects and advantages of my invention will become apparent as the following description proceeds, and the features of novelty which characterize my invention will be pointed out with particularity in the claims annexed to and forming a part of this specification.

For a better understanding of my invention, reference may be had to the following description taken in connection with the accompanying drawing in which:

Fig. 1 illustrates more or less diagrammatically an absorption refrigeration system to which the invention is applied; and Fig. 2 diagrammatically illustrates an embodiment of the invention for controlling an absorption refrigeration system of a type exemplified by the system shown in Fig. 1.

In the drawing I have shown my invention applied to an absorption refrigeration system of a uniform pressure type which is well known in the art, and in which an inert pressure equalizing gas is employed. Referring to Fig. 1, such a refrigeration system comprises a generator or vapor expulsion unit 10 including a boiler or pipe 11 containing a refrigerant, such as ammonia, in solution in a body of absorption liquid, such as water. Heat is supplied to the boiler 11 from a heating tube 12 thermally connected therewith at 14, as by welding, for example. The heating tube 12 desirably may be heated by an electrical heating element 15 which is positioned therein and connected by conductors 16 and 17 to a source of electrical energy, as best shown in Fig. 2.

The heat supplied to the boiler 11 and its contents expels refrigerant vapor out of solution and, as will be described more fully hereinafter, the vapor passes upwardly from the vapor expulsion unit 10 through a conduit 18 and air-cooled rectifier 19 into an air-cooled condenser 20 in which it is condensed and liquefied. Liquid refrigerant flows from condenser 20 through a U-shape conduit 21 into a cooling element or evaporator 22 in which it evaporates and diffuses into an inert pressure equalizing gas, such as hydrogen, which enters the upper end thereof through a conduit 23. Due to evaporation of refrigerant fluid into inert gas, a refrigerating effect is produced with consequent absorption of heat from the surroundings.

The rich gas mixture of refrigerant vapor and inert gas formed in cooling element 22 flows from the lower part thereof through an outer passage 24 of gas heat exchanger 25, conduit 26 and absorber vessel 27 into the lower end of an absorber coil 28. In absorber coil 28 the rich gas mixture flows countercurrent to downwardly flowing absorption liquid which is introduced into the upper end of the coil through a conduit 29. The absorption liquid absorbs refrigerant vapor from inert gas, and inert gas weak in refrigerant flows from absorber coil 28 through the inner passage 30 of gas heat exchanger 25 and conduit 23 into the upper part of the cooling element 22.

The circulation of gas in the inert gas circuit just described is due to the difference in specific weight of the columns of gas rich and weak, respectively, in refrigerant vapor. Since the column of gas rich in refrigerant vapor and flowing from cooling element 22 to the absorber coil 28 is heavier than the gas weak in refrigerant and flowing from the absorber coil 28 to cooling element 22, a force is produced or developed within the system for causing circulation of inert gas in the manner described.

Absorption solution enriched in refrigerant flows from the absorber vessel 27 through a conduit 31 which forms the outer passage of a liquid heat exchanger 32. Such enriched absorption solution is conducted from the passage or conduit 31 into a vertically extending standpipe 33 at a point which is below the liquid surface level therein. The extreme lower end of the standpipe 33 is closed and connected to the lower end of a vapor-liquid lift tube 34 in thermal exchange relation with the heating tube 12 at 35, as by welding, for example. Liquid is raised by vapor-liquid lift action through tube 34 into the upper part of the boiler 11. Refrigerant vapor expelled out of solution in boiler 11, together with refrigerant vapor discharged from the upper end of riser tube 34, flows through a conduit 36 to a region 37 in standpipe 33 which is below the liquid surface of the liquid contained therein. The region 37 may be referred to as an analyzer in which entering vapor bubbles through enriched absorption solution and is analyzed, whereby absorption liquid vapor will be removed from refrigerant vapor. After being analyzed the vapor flows upwardly through the upper part of standpipe 33 and conduit 18 to the air-cooled rectifier 19 and air-cooled condenser 20, as explained above.

The absorption solution from which refrigerant vapor has been expelled flows from the boiler 11 through the inner passage or conduit 38 of the liquid heat exchanger 32 and conduit 29 into the upper part of absorber coil 28. The circulation of liquid in the absorption solution circuit just described is effected by raising of liquid through riser tube 34. The outlet end of condenser 20 is connected by a conduit 39 to a part of the gas circuit, as to the outer passage 24 of gas heat exchanger 25, for example, so that any inert gas which may pass through the condenser 20 can flow to the gas circuit. The conduit 21 desirably may be in heat exchange relation with the gas heat exchanger 25 for precooling liquid refrigerant in its path of flow from condenser 20 to cooling element 22.

The refrigeration system just described may be controlled by a thermal bulb 40 which is affected by a temperature condition of cooling element 22. As shown in Figs. 1 and 2, the thermal bulb 40 is arranged in thermal exchange relation with the cooling element 22 and connected by a tube 41 to a control device 42 operatively associated with a switch 43 connected in one of the conductors 44 for supplying electrical energy to heating element 15. The thermal bulb 40 and tube 41 may form part of an expansible fluid thermostat which is charged with a suitable volatile fluid and responds to changes in temperature of cooling element 22 to operate control device 42, in a manner well known in the art.

The control arrangement of Fig. 2 is of the "on" and "off" type in which the thermal bulb 40 becomes effective to cause control device 42 to close switch 43 and energize heating element 15 when the temperature of cooling element 22 increases due to increase in load caused by placing of warm material in the thermally insulated interior of the refrigerator or rise in room air temperature, for example. Conversely, when the cooling element reaches a predetermined low temperature, the thermal bulb 40 becomes effective to cause control device 42 to open switch 43 and disconnect heating element 15 from the source of electrical supply. When the switch 43 is closed, a circuit is completed for the heating element 15 which includes conductor 16, heating element 15, conductor 44 in which the switch 43 is connected, and a conductor 45, the conductors 16 and 45 being connected to a source of electrical supply.

The cooling element or evaporator 22 comprises low and higher temperature cooling sections 22a and 22b which are shown in the form of coils and adapted to be positioned in thermal exchange relation with the interior of a refrigerator cabinet. The low temperature cooling section 22a constitutes the freezing portion of the evaporator and the higher temperature cooling section 22b, which may be provided with a plurality of heat transfer fins 46 to provide a relatively extensive heat transfer surface, is employed for cooling foods at a temperature above the freezing temperature of water.

The cooling sections 22a and 22b are connected in series relation with inert gas from conduit 23 flowing through cooling sections 22a and 22b in the presence of and in parallel flow with liquid refrigerant which is introduced through conduit 21. From the lower part of cooling section 22b any unevaporated refrigerant flows into the outer passage 24 of gas heat exchanger 25 and conduit 26 into the absorber vessel 27.

In order to increase the temperature of cooling section 22a when it is desired to melt frost which may accumulate thereon, provision is made for raising warm absorption solution from boiler pipe 11 through a riser conduit 47 from the upper end of which absorption solution flows by gravity into cooling element 22. In this manner, rapid defrosting is effected due to the relatively high temperature to which the absorption solution is heated in the vapor expulsion unit 10. The absorption solution passes from the cooling element 22 through the gas heat exchanger 25 and conduit 26 to the absorber vessel 27.

The riser conduit 47 constitutes a vapor-liquid lift through which absorption solution is raised when desired by heat derived from a heating tube 48 which is disposed above the heating tube 12 and insulated therefrom at 49 in any suitable manner. The riser conduit 47 is in thermal exchange relation with the heating tube 48 at 50, as by welding, for example, along a vertical line, the upper limit of which is essentially at the same level as the region at which absorption solution overflows from the upper end of conduit 29 into the top part of the absorber coil 28. The heating tube 48 desirably is heated by a heating element 51 which is positioned therein and adapted to be connected to the source of electrical energy when defrosting of cooling element 22 is desired, as will be explained presently.

It will be seen in Fig. 1 that the lower end of conduit 47 is of U-shape and connected to boiler 11 at a region which is at a level below the upper limit of the vertical line along which the riser conduit 47 is in thermal exchange relation with the heating tube 48. When heating element 51 is deenergized and heating element 15 is energized, at which time normal circulation of absorption solution is being effected through and between boiler 11 and absorber coil 28 in the manner explained above, the liquid levels in the boiler 11 and conduit 47 are the same and at a region which is a sufficient distance above the upper end of conduit 29, so that gravity flow of absorption solution is effected from boiler 11 to the upper part of absorber coil 28 into which solution overflows from the upper end of conduit 29. Hence, during normal circulation of absorption solution, the column of liquid in boiler 11 extends upwardly from the region riser conduit 47 is connected thereto to a region which is at a level above the extreme upper end of conduit 29, the liquid column contained in boiler 11 being higher than that in conduit 29 to overcome the friction losses in the path of flow of absorption solution from the boiler to the upper part of the absorber coil 28.

When it is desired to defrost cooling element 22 and melt frost accumulated thereon, heating element 51 is energized to effect heating of heating tube 48, thereby rendering riser conduit 47 operable to raise absorption solution from boiler 11 to the cooling element by vapor-liquid lift action under the influence of the reaction head formed by the liquid column in the upper part of the boiler and the downwardly depending portion of conduit 47 connected thereto. Stated another way, the weight of the column of liquid in the right-hand arm of the U-shape bend of riser conduit 47 and the part of the liquid column in boiler 11 above the connection of conduit 47 thereto overbalances the weight of the column of segregated liquid bodies and vapor in the upwardly extending arm of riser conduit 47 to cause rise of liquid in the latter.

As warm absorption solution is being introduced into cooling element 22 to effect rapid defrosting thereof, the liquid surface level in the boiler 11 falls. When the liquid surface level in boiler 11 falls sufficiently so that solution no longer overflows from the upper end of conduit 29 into the top part of absorber coil 28, the normal circulation of absorption solution through and between the boiler and absorber coil 28 is terminated and refrigerant vapor will no longer be absorbed from inert gas. When this occurs, the difference in specific weight of the columns of gas rich and weak, respectively, in refrigerant vapor becomes progressively smaller and eventually the circulation of inert gas will stop. When the circulation of inert gas stops, liquid refrigerant introduced into the cooling element 22 will no longer be capable of evaporating and diffusing into inert gas to produce a low temperature refrigerating effect. This aids and assists the warm absorption solution flowing into the low temperature cooling section 22a to hasten and speed up the defrosting of the latter.

By introducing warm absorption solution from the upper part of boiler 11 into cooling element 22 whenever defrosting of the latter is desired, absorption solution for such defrosting purpose is being transferred from a part of the absorption solution circuit at a relatively high level. This means that the vertical height, through which warm absorption solution must be raised for introduction into the cooling element, is at a minimum, which, in turn, means that the reaction head for raising such solution by vapor-liquid lift action may be maintained within reasonable limits. In order that a reaction head will always be available to insure lifting of warm absorption solution through riser conduit 47 into cooling element 22, whenever defrosting of the latter is desired, the heating element 15 desirably should be energized to render lift tube 34 operable to raise solution into the upper part of boiler 11 whenever heating element 51 is energized to render riser conduit 47 operable to raise warm absorption solution into cooling element 22.

In accordance with my invention, heating elements 15 and 51 are simultaneously energized whenever defrosting of cooling element 22 is desired, even when the cooling element 22 is at a desired low temperature and the bulb 40 becomes effective to cause control device 42 to open switch 43 and normally disconnect heating element 15 from the source of electrical supply. As shown in Fig. 2, I accomplish this by providing a defrosting switch 52 having a rotatable member formed with arms or fingers 53, 54 and 55 adapted to engage stationary contacts 56, 57 and 58, respectively. In its "off" position the contact arms of switch 52 are disengaged from the stationary contacts, as shown in Fig. 2. Under these conditions, an electrical circuit is completed for heating element 15 whenever the control device 42 becomes effective to close switch 43, such circuit across the source of electrical supply including conductor 16, heating element 15, conductors 17 and 45 and conductor 44 in which the switch 43 is connected. In Fig. 2 it will be noted that the ends of conductor 44 are connected to contacts 57 and 58, respectively, of the defrosting switch 52.

When defrosting switch 52 is operated to effect defrosting of cooling element 22, the rotatable member is moved in a clockwise direction in Fig. 2 so that arms 53, 54 and 55 engage contacts 56, 57 and 58, respectively. Under these conditions, an electrical circuit is completed for heating element 51 across the source of electrical supply, such circuit including conductors 16 and 59, heating element 51, conductor 60, switch arms 53 and 55 and conductor 45. In the event the control device 42 is effective to open switch 43 at the time defrosting of cooling element 22 is instigated, an alternative circuit is also completed for heating element 15 at the same time heating element 51 is energized to render riser conduit 47 operable to pump warm absorption solution into cooling element 22. The alternative circuit for heating element 15 across the source of electrical supply includes conductor 16, heating element 15, conductor 17, switch arms 54 and 55 and conductor 45. Hence, when switch 52 is moved to its "on" position to instigate a defrosting operation, heating elements 15 and 51 are connected in parallel across conductors 16 and 45 by the switch 52.

Hence, when defrosting of cooling element 22 is being effected, the lift tube 34, which serves as a pump in the main absorption solution circuit, remains operable to lift solution into the upper part of the boiler 11, thus insuring that the necessary reaction head will be maintained in the upper part of the boiler to effect raising of warm absorption solution into the cooling element 22 for gravity flow therethrough. Due to transfer of warm absorption solution from the boiler 11 to cooling element 22, the liquid surface level in the boiler falls and eventually the normal circulation of absorption solution through and between the absorber coil 28 and boiler 11 terminates, as previously explained, thereby slowing down the circulation of inert gas and promoting defrosting of the cooling element 22.

It will be understood that the rotatable member of the defrosting switch 52 may be operated manually or in any other suitable manner, as by a timing device, or be automatically responsive to accumulation of frost on the cooling element 22, for example. When the defrosting of cooling element 22 is terminated and the switch 52 is opened to disconnect heating element 51 from the source of electrical supply, the control device 42 again becomes operable to control heating element 15 responsive to a temperature condition influenced or affected by the cooling element 22, the heating element 15 being disconnected from the source of electrical supply when the cooling element 22 reaches a predetermined low temperature.

Modifications of the embodiment of my invention which I have described and illustrated will occur to those skilled in the art, so that I desire my invention not to be limited to the particular arrangement set forth. For example, sources of heat other than electrical heating elements may be employed to effect normal circulation of absorption solution and transfer of warm absorption solution to the cooling element to effect defrosting thereof. Therefore, I intend in the claims to cover all those modifications which do not depart from the spirit and scope of my invention.

What is claimed is:

1. Absorption refrigeration apparatus comprising an absorption liquid circuit including a first vapor-liquid lift pump for normally effecting circulation of liquid in said circuit, means including a second vapor-liquid lift pump for raising absorption liquid from said circuit to a level in the apparatus normally free of such liquid, means including a first electrical heating element for operating said first lift pump, means including a second electrical heating element for operating said second lift pump, means including a first switch for controlling said first electrical heating element, and means including a second switch for controlling said second electrical heating element, said last-mentioned means including provisions for completing a circuit for the first electrical heating element whenever a circuit is completed for the second electrical heating element, thereby completing a circuit for the first electrical heating element even when said first switch is rendered ineffective to complete a circuit for said first electrical heating element.

2. Apparatus as set forth in claim 1 which includes a cooling element into which raised absorption liquid is discharged from said second lift tube, and means for operating said first switch responsive to a temperature condition affected by said cooling element.

3. In an absorption refrigeration system having a plurality of interconnected parts including an evaporator, condenser and a circuit for absorption solution comprising a vapor expulsion unit including a vapor-liquid lift pump, said condenser being connected to receive refrigerant vapor expelled from solution in said vapor expulsion unit when heat is supplied thereto at a normal rate and to deliver refrigerant fluid in liquid phase therefrom to said evaporator, said absorption solution circuit including a part which receives absorption solution therein, conduit means connecting said part and said evaporator, means including a first source of heat for supplying heat at the normal rate to said vapor expulsion unit, means including a second source of heat for heating said part to effect transfer of warm fluid therefrom through said conduit means to said evaporator to effect heating of the latter and melt any frost formed thereon, means including a first control member for controlling said first source of heat, and means including a second control member for controlling said second source of heat, said last-mentioned means including provisions for effecting heating of said vapor expulsion unit at the normal rate by said first source of heat whenever said second control member is rendered effective to effect heating of said part by said second source of heat to transfer warm fluid therefrom, thereby effecting heating of said vapor expulsion unit at the normal rate by said first source of heat even when said first control member is rendered ineffective to effect heating of said vapor expulsion unit at the normal rate by said first source of heat.

4. An absorption refrigeration system as set forth in claim 3 in which said means including said first control member embodies provisions for controlling said first source of heat responsive to an operating condition of the system.

5. An absorption refrigeration system as set forth in claim 3 in which said means including said first control member embodies provisions for controlling said first source of heat responsive to a temperature condition affected by said evaporator.

6. Absorption refrigeration apparatus comprising an absorption liquid circuit including a first vapor-liquid lift pump for normally effecting circulation of liquid in said circuit, means including a second vapor-liquid lift pump for raising absorption liquid from said circuit to a level in the apparatus normally free of such liquid, means including a first source of heat for operating said first lift pump, means including a second source of heat for operating said second lift pump, means including a first control member for controlling said first source of heat, and means including a second control member for controlling said second source of heat, said last-mentioned means including provisions for effecting heating of said first lift pump by said first source of heat whenever said second control member is rendered effective to effect heating of said second lift pump by said second source of heat, thereby effecting heating of said first lift pump by said first source of heat even when said first control member is rendered ineffective to effect heating of said first lift pump by said first source of heat.

7. Absorption refrigeration apparatus as set forth in claim 6 which includes a cooling element subject to formation of frost thereon, said second lift pump being connected to raise liquid from said circuit to said level in the apparatus for gravity flow through said cooling element.

8. Absorption refrigeration apparatus as set forth in claim 7 in which said means including said first control member embodies provisions for controlling said first source of heat responsive to a temperature condition affected by said cooling element, said means including said first control member being capable of completely controlling said first source of heat only when said second source of heat is rendered ineffective to effect heating of said second lift pump by said second source of heat.

9. In an absorption refrigeration apparatus having a plurality of interconnected parts including a boiler member and a first vapor-liquid lift pump, connecting means including a second vapor-liquid lift pump for conducting absorption solution from the upper part of said boiler member to a part at a higher level in the apparatus, means including a first source of heat for heating said boiler member and operating said first lift pump, means including a second source of heat for operating said second lift pump, means including a first control member for controlling said first source of heat, and means including a second control member for controlling said second source of heat, said last-mentioned means including provisions for effecting heating of said boiler member and first lift pump by said first source of heat whenever said second control member is rendered effective to effect heating of said second lift pump by said second source of heat, thereby effecting heating of said boiler member and said first lift pump by said first source of heat even when said first control member is rendered ineffective to effect heating of said boiler member and said first lift pump by said first source of heat.

10. Apparatus as set forth in claim 9 in which said means including said first control member embodies provisions for controlling said first source of heat responsive to an operating condition of the refrigeration apparatus.

11. Apparatus as set forth in claim 9 which includes a cooling element subject to formation of frost thereon, said second lift pump being connected to raise liquid from said boiler member to said higher level for gravity flow through said cooling element, said means including said first control member embodying provisions for controlling said first source of heat responsive to a temperature condition affected by said cooling element.

12. Apparatus as set forth in claim 9 in which said circuit for absorption liquid includes an absorber and said first lift pump circulates solution through and between said boiler member and said absorber, said boiler member being connected to receive solution discharged from the upper end of said first lift pump, said connecting means for conducting absorption solution to the part at the higher level from said boiler member being connected to the latter at a region below that at which solution from said boiler member is introduced into the inlet end of said absorber, said region being located at such a level with respect to the inlet end of said absorber that, after solution is transferred to said part at the higher level from said boiler member, the liquid surface in said boiler member falls to a level at which gravity flow of solution from said boiler member to said absorber stops.

References Cited in the file of this patent

UNITED STATES PATENTS

| | | |
|---|---|---|
| 2,195,288 | Shagaloff | Mar. 28, 1940 |
| 2,402,413 | Kogel | June 18, 1946 |
| 2,402,417 | Kogel | June 18, 1946 |
| 2,555,345 | Kogel | June 5, 1951 |
| 2,670,607 | Hainsworth | Mar. 2, 1954 |